United States Patent [19]

Suzuki et al.

[11] 4,425,032

[45] Jan. 10, 1984

[54] CAMERAS AND CIRCUITS FOR SENSING THE ACTION OF CAMERA SHUTTERS

[75] Inventors: Ryoichi Suzuki, Kawasaki; Ryuji Tokuda, Tokyo, both of Japan

[73] Assignee: Canon Kabushiki Kaisha, Tokyo, Japan

[21] Appl. No.: 321,208

[22] Filed: Nov. 13, 1981

[30] Foreign Application Priority Data

Nov. 18, 1980 [JP] Japan ................................ 55-162151

[51] Int. Cl.³ ............................................. G03B 7/097
[52] U.S. Cl. ................................................. 354/458
[58] Field of Search ......................... 354/29, 30, 49, 50

[56] References Cited

U.S. PATENT DOCUMENTS 4,174,893 11/1979 Burgarella et al. .................... 354/29
4,176,929 12/1979 Ito et al. ............................. 354/49 X Primary Examiner—Michael L. Gellner
Attorney, Agent, or Firm—Toren, McGeady and Stanger

[57] ABSTRACT

In the disclosed cameras, movable shutter members which cover a main aperture define a sub-aperture which is arranged first to close from a pre-opened state and then to open so as to control the exposure on the basis of brightness information. A first detector produces a first signal when the sub-aperture is closed, a second detector produces a second signal after a time determined by the brightness information, and a shutter detector is controlled by the first and second detectors to inform an operator that the shutter members have operated normally.

8 Claims, 2 Drawing Figures

CAMERAS AND CIRCUITS FOR SENSING THE ACTION OF CAMERA SHUTTERS

BACKGROUND OF THE INVENTION

1. Field of the Invention

This invention relates to a camera and more particularly to a circuit for sensing the action of a camera shutter.

2. Description of the Prior Art

Application of electronics to cameras has popularized electrical shutter time control. As a result of this, the exposure precision and the reliability of cameras has been greatly improved over the conventional cameras of the mechanical control type. However, mechanical shutter blades are still in use as shutter members of cameras. It has been impossible, therefore, to insure a camera from difficulties due to mechanical shutter members. For example, there have been occurrences of trouble due to the shutter members remaining inoperative after a shutter release operation and thus causing photographic failure. In view of this, it has become necessary to mechanically detect the actions of shutter members, for example, by means of a count switch of an electronic shutter, or the like, and to find out whether or not the shutter members have normally operated. However, even with such a method, it is still impossible to accurately sense the action of shutter members.

This is so because, when the action of shutter members is to be detected by a count switch as mentioned, the count switch itself tends to get out of order due to its mechanical construction. Therefore, while the shutter members fail to work, the count switch might not indicate this failure of the shutter members. The conventional discriminating or sensing method thus has been unable to always accurately detect the action of shutter members.

SUMMARY OF THE INVENTION

This invention is directed to the solution of the problems described in the foregoing. It is therefore an object of the invention to provide a shutter action discrimination circuit which obviates the shortcoming of the prior art. The discrimination or sensing circuit according to this invention is arranged in a camera of the type having a sub-aperture which is provided for the purpose of measuring light coming from an object to be photographed and is arranged to be closed first from a pre-open state and then to be opened in association with the opening action of shutter members with which a main aperture of the shutter is covered. In accordance with the invention, the discrimination circuit includes a detection circuit for detecting variation in the output of a light sensitive element which is provided for the measurement of the object's light; and the shutter action is detected through the variation of the photo-electric output of the light sensitive element.

The above and further objects, features and advantages of the invention will become apparent from the following detailed description of an embodiment thereof taken in connection with the accompanying drawings.

DETAILED DESCRIPTION OF PREFERRED EMBODIMENT

Figure 1:
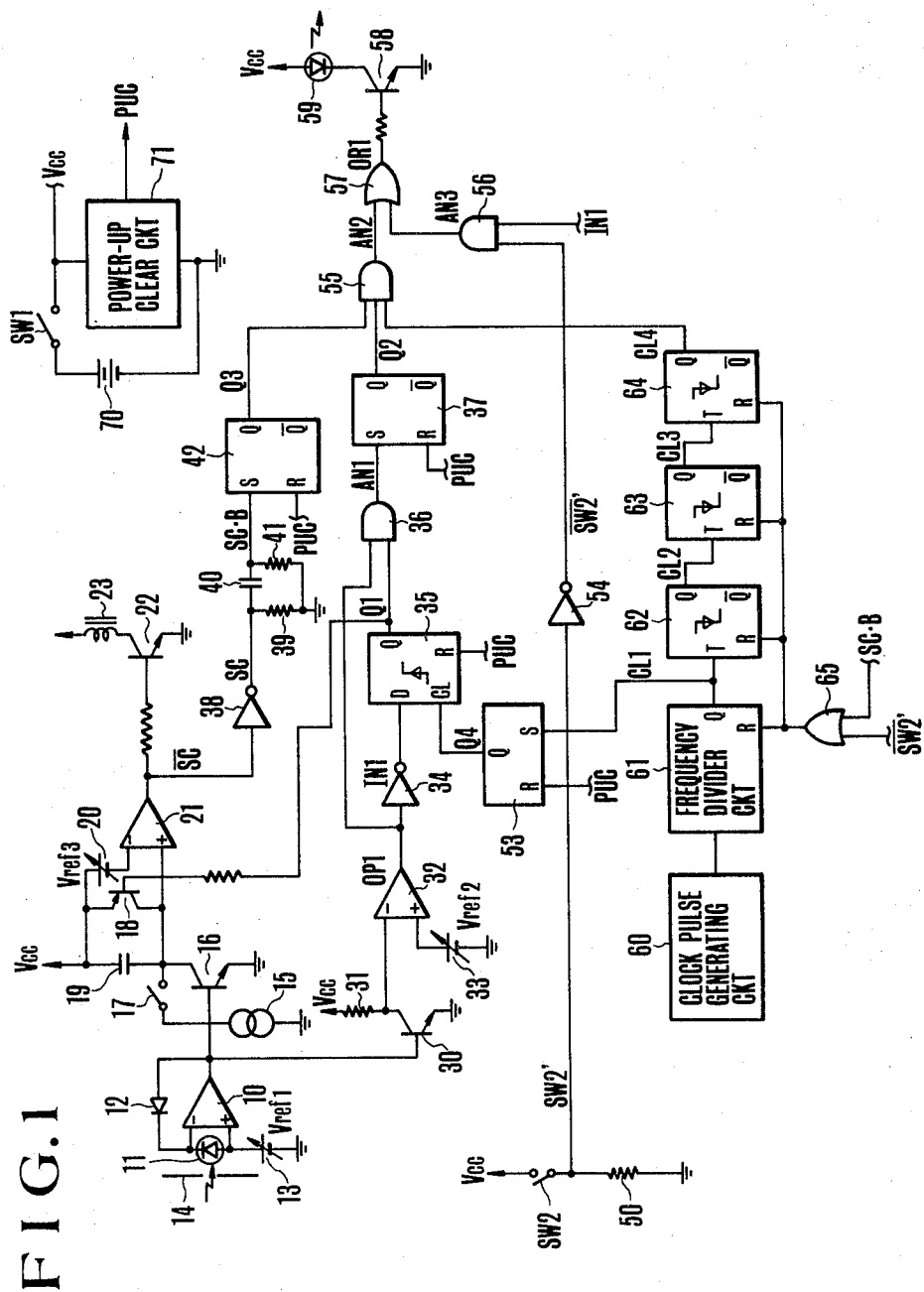
FIG. 1 is a circuit diagram showing, as an embodiment of the invention, a camera to which the shutter action discriminating circuit according to the invention is applied.

FIG. 1 which shows portions of a camera having the shutter action discrimination circuit embodying the invention, includes operational amplifier 10 of the MOS FET input type; a silicon photo cell (hereinafter called SPC) 11 which is connected between two input terminals of the operational amplifier 10; a diode 12 which is connected to the negative feedback path thereof; a reference voltage source 13 which supplies a bias voltage to the non-inverting input terminal of the operational amplifier 10; and a sub-aperture 14. The SPC 11 is arranged to measure a light passing through the sub-aperture 14. The sub-aperture 14 is arranged to be opened and closed by blade members which are either interlocked with or formed integrally with shutter members which are arranged to cover a main aperture of the shutter (not shown) and also to serve as diaphragm. When the shutter members are set in the initial position, the sub-aperture is in a pre-open state to allow the SPC 11 to be irradiated with a pre-photometric light flux. Before the shutter members move into their exposure starting position, the sub-aperture 14 first goes into a light shielding state and, after that, gradually changes its aperture value in association with the movement of the shutter members. A transistor 16 for expansion has a time constant capacitor 19 connected to the collector thereof. Another transistor 18 which serves as count switch for starting count is connected in parallel with the capacitor 19. The base of the transistor 18 is connected to the output terminal Q1 of a D flip-flop 35 which will be further described hereinafter. A switch 17 is arranged to close at the time of flash photography while a constant current source 15 determines a shutter time for flash photography. A comparator 21 has a reference voltage source 20 connected to its inverting input terminal to receive a reference voltage level Vref3 therefrom. Meanwhile, the non-inverting input terminal of the comparator 21 is connected to the collector of the expanding transistor 16. A switching transistor 22 has its base connected to the output terminal of the comparator 21. Meanwhile, a solenoid 23 of an electromagnetic device for holding the shutter open is connected to the collector of the switching transistor 22. A transistor 30 for expansion is connected to the output terminal of the operational amplifier 10 while a resistor 31 is connected to the collector of the transistor 30. A reference numeral 32 indicates a comparator. The inverting input terminal of the comparator 32 is connected to the collector of the expanding transistor 30 while the non-inverting input terminal of the comparator 32 is connected to a reference voltage source 33 which is arranged to give a reference voltage level Vref2. An inversion circuit 34 is connected to the output terminal OP1 of the comparator 32. A numeral 35 indicates a D flip-flop circuit (hereinafter called D-FF). The D input terminal of the D-FF 35 is connected to the output terminal IN1 of the above stated inversion circuit 34. An AND gate 36 has two input terminals which are respectively connected to the output terminal OP1 of the comparator 32 and to the output Q1 of the D-FF 35. An RS flip-flop circuit 37 (hereinafter called RS-FF) has its set input terminal connected to the output terminal AN1 of the above stated AND gate 36. The above stated comparator 21 has an inverter circuit 38 connected to the output terminal $\overline{SC}$ thereof. To this output terminal SC are connected resistors 39 and 41 and a capacitor 40 which jointly constitute a differentiation circuit. The set input terminal of an RS flip-flop circuuit (RS-FF) 42 is connected to the output SC.B of the inversion circuit 38. A switch SW2 is arranged to be closed at the second position or step in the stroke of a shutter button (not shown). An RS flip-flop circuit 53 has its output terminal Q4 connected to the clock input terminal CL of the above stated D-FF 35. An inversion circuit 54 is connected to a connection point SW2' between the switch SW2 and a resistor 50. An AND gate 55 has three inputs. Two of the three input terminals of the AND gate 55 are respectively connected to the Q output terminals Q2 and Q3 of the above stated RS-FF 37 and the RS-FF 42. An AND gate 56 has two inputs. The two input terminals of the AND gate 56 are respectively connected to the output terminal SW2' of the above stated inversion circuit 54 and to the output terminal IN1 of the inversion circuit 34. An OR gate 57 has two inputs. The two input terminals of the OR gate 57 are connected to the output terminals AN2 and AN3 of the AND gates 55 and 56 respectively. The output terminal OR1 of the OR gate 57 is connected to the base of a switching transistor 58 through a resistor. The switching transistor 58 has its collector connected to a light emitting diode 59 which is provided for low light warning and for a monitor display. The circuit further includes a clock pulse generating circuit 60 of period 1 KHz a frequency divider circuit 61 of two bits; T type flip-flop circuits 62–64 (hereinafter called T-FF) which are connected in series with the output terminal CL1 of the frequency divider circuit 61 and each of which has its output terminal Q connected to the input terminal T of another arranged subsequently thereto; and an OR gate 65 having two input terminals which are respectively connected to the output terminal SCB of the above stated differentiation circuit (39–41) and to the output terminal $\overline{SW2'}$ of the inversion circuit 54. Meanwhile, the output of the OR gate 65 is arranged to be supplied to the reset terminals of the frequency divider circuit 61 and the T-FFs 62–64. The output terminal CL1 of the frequency divider circuit 61 is connected to the set terminals of the above stated RS-FF 53. The output terminal CL4 of the T-FF 64 is connected to one of the input terminals of the AND gate 55. The camera is provided with a power source battery 70; a main switch SW1 which is arranged to be closed at the first step or position of an operating stroke of the shutter button of the camera; and a power up clear circuit 71 which produces one pulse when the power source is turned on (when the switch SW1 is closed). The output terminal PUC of the power up clear circuit is connected to the reset terminals R of the D-FF 35, RS-FF 37, RS-FF 42 and RS-FF 53.

Figure 2:
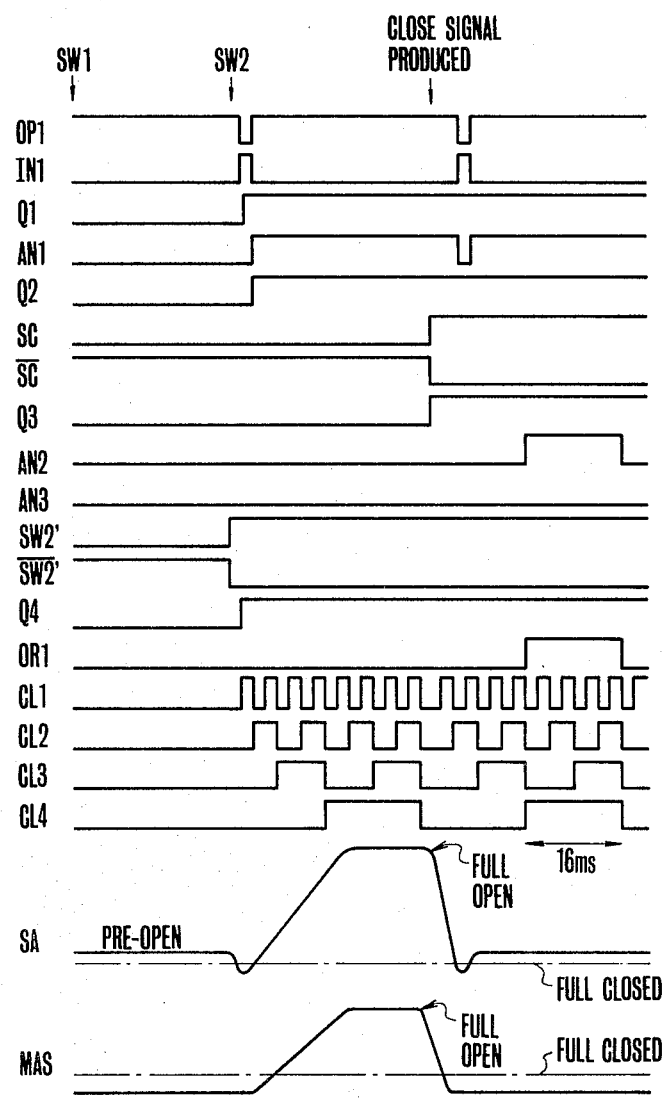
FIG. 2 is a wave-form chart showing the operation of the embodiment shown in FIG. 1.

The circuit arranged as shown in FIG. 1 operates in the following manner: Referring to the wave-form chart of FIG. 2, let us first cover day light photography with the shutter operating in the normal manner. When the main switch SW1 is closed at the first step in the stroke of the shutter button of the camera, the power up clear circuit 71 produces one pulse. The D-FF 35 and the RS-FFs 37, 42 and 53 are reset by this. Then, the Q outputs of them all become a low level (hereinafter called an L level). Further, with the main switch SW1 closed, each circuit receives a power supply. The operational amplifier 10 produces an output corresponding to the brightness of an object to be photographed. Assuming now that the brightness is at the level for day light photography, the level of the output of the operational amplifier 10 becomes relatively high. The level of the collector potential of the transistor 30 becomes lower than the reference level Vref2. The output OP1 of the comparator 32 becomes high (hereinafter called an H level). Therefore, the output IN1 of the inversion circuit 34 becomes an L level. This L level output is transmitted to one of the input terminals of the AND gate 56 to cause the output AN3 of the AND gate to be of an L level. Since the RS-FF 37 is then in a reset state as mentioned above and thus has its output Q2 at an L level, the level of the output AN2 of the AND gate 55 is also low. This causes the level of the output of the OR gate OR1 to become low. The transistor 58 is thus kept off to extinguish the light emitting diode 59 and indicate that the brightness is on an adequate exposure level. After that, when the shutter button is further operated to the second step or position in its stroke, the switch SW2 closes in response to this. With the switch SW2 closed, the SW2' becomes an H level and the output $\overline{SW2'}$ of the inversion circuit 54 becomes an L level. Further, the output $\overline{SC}$ of the comparator 21 is at an H level and the output SC of the inversion circuit 38 is at an L level. The output of the OR gate 65, therefore, is inverted to an L level. The frequency divider circuit 61 and the T-FFs 62–64 are released from their reset states. Accordingly, the frequency divider circuit 61 frequency divides the clock pulses produced from the pulse generating circuit 60 and, about 2 ms after closing of the switch SW2, the output CL1 of the frequency divider circuit 61 is inverted to an H level. An inversion signal thus obtained sets the RS-FF 53 of the subsequent stage to invert the Q output Q4 thereof to an H level. Meanwhile, the second step or position in the stroke of the shutter button causes shutter members which are not shown to begin to work. As shown at MAS in FIG. 2, they carry out an exposure action by gradually enlarging the exposure aperture. In association with the shutter members, the sub-aperture 14 is then opened as shown at SA in FIG. 2. Therefore, about 1.5 ms after the commencement of the shutter action, the sub-aperture 14 changes from its pre-open state to a fully closed state. Accordingly, the SPC 11 is temporarily shut off from light and the output of the operational amplifier 10 is lowered. The collector potential of the expanding transistor 30 becomes high. The level of the output OP1 of the comparator 32 changes to an L level and, conversely, that of the output IN1 of the inversion circuit 34 changes to an H level. Immediately after that, the Q output Q4 of the RS-FF 53 is inverted to an H level as mentioned above. Therefore, the Q output Q1 of the D-FF 35 is inverted to an H level. Then, the output condition of the output IN1 of this inversion circuit 34 is latched. In other words, at the time when the sub-aperture 14 first comes to close from its pre-open state, the output Q1 of the D-FF 35 is inverted to an H level and is latched. Following that, the sub-aperture 14 begins to again open from the fully closed state in association with the shutter members. Accordingly, the level of the output of the operational amplifier 10 becomes high. The collector potential of the expending transistor 30, therefore, becomes low and the level of the output OP1 of the comparator 32 again becomes high. Since the output Q1 of the D-FF 35 is latched at an H level at this point of time as mentioned above, the output AN1 of the AND gate 36 also becomes an H level. The RS-FF 37 which is disposed at the next stage is set to have the Q output Q2 thereof inverted to an H level and latched at the H level. In other words, the output Q2 of the RS-FF 37 changes to the H level by detecting that the sub-aperture 14 has been first closed from its pre-open state and again opened. On the other hand, since the transistor 18 is turned off in response to the output Q1 of the D-FF 35, the time constant capacitor 19 is charged with the collector current of the expanding transistor 16. When the level of this charge reaches a predetermined value, i.e. after the lapse of a length of time corresponding to the brightness, the output $\overline{SC}$ of the comparator 21 is inverted to an L level to turn off the switching transistor 22. This causes the power supply to the shutter holding magnet 23 to be cut off. Then, the shutter members are actuated to begin a shutter closing action as shown at MAS in FIG. 2. Concurrently with this, the output SC of the inversion circuit 38 is inverted to an H level. The differentiation circuit (39–41) then generates positive differentiation pulses SC.B. The RS-FF 42 at the next stage is set by the pulses to have the Q output Q3 thereof inverted to an H level. Further, the differentiated pulses SC.B goes through the OR gate 65 to first reset all of the T-FFs 62–64 to cause them to perform a counting action from an initial point. Then, 16 ms after this reset action, the Q output CL4 of the T-FF 64 goes to an H level. This H level is kept for 16 ms. Since the outputs Q2 and Q3 of the RS-FFs 42 and 37 on the other hand are latched at an H level as mentioned above, the output AN2 of the AND gate 55 and the output OR1 of the OR gate 57 also go to an H level and remain at the H level for 16 ms. The switching transistor 58 is turned on by this to have the light emitting diode 59 lighted up to let the photographer known that the shutter has normally operated.

Next, with an abnormal shutter operation, that is, when the shutter remains closed even after a release operation, the discrimination circuit according to the invention operates as follows: In this case, the shutter members remain inoperative even when the shutter button is depressed. Accordingly, the sub-aperture 14 is kept in its pre-open state. The output CP1 of the comparator 32 is kept at an H level. Accordingly, the output IN1 of the inverter circuit 34 is kept at an L level. The output Q1 of the D-FF 35 is also kept at an L level. The output AN1 of the AND gate 36 is also at an L level. The output Q2 of the RS-FF 37 also remains latched at an L level. In this case, therefore, both the output AN2 of the AND gate 55 and the output OR1 of the OR gate 57 are kept at an L level. The transistor 58 remains off. The light emitting diode 59 remains extinguished. The extinguished state then allows the photographer to know that the shutter has not performed a normal action.

The operation for flash photography is as follows: Under conditions for flash photography, when the shutter button is depressed to the first step or position of its stroke, the operational amplifier 10 produces an output corresponding to the brightness as mentioned in the foregoing. If the brightness is low, the level of the output of the amplifier 10 is low. The collector potential of the transistor 30 is higher than the reference voltage Vref2. The output OP1 of the comparator 32 is at an L level. The output IN1 of the inversion circuit 34 is at an H level. The high level output IN1 of the inverting circuit 34 is then transmitted to one of the input terminals of the AND gate 56. Meanwhile, the switch SW2 is in a opened state and the output $\overline{SW2}$ of the inversion circuit 54 is at an H level. Therefore, the output AN3 of the AND gate 56 goes to an H level. This H level is impressed on the base of the transistor 58 to turn on the transistor 58. With the transistor 58 turned on, the light emitting diode 59 lights up to warn against low brightness. This warning then informs the operator of necessity for flash photography. Where the camera has a flash device incorporated therein, the operator brings it into an operative state. In the case of a camera having no flash device incorporated therein, the operator mounts a flash device on the camera.

After that, when the shutter button is further operated to the second step or position of its stroke, the switch SW2 closes. The output $\overline{SW2}$ of the inversion circuit 54 becomes an L level. This causes the output of the AND gate 56 to become an L level and the light emitting diode 59 is extinguished thereby. Meanwhile, the second step of the stroke operation on the shutter button causes the shutter members to begin an exposure action as mentioned in the foregoing. Concurrently with this, the frequency divider circuit 61 and the T-FFs 62–64 are released from their reset state by the OR gate 65. Then, as mentioned in the foregoing, the RS-FF 53 is set 2 ms after the commencement of the shutter action. The output Q4 of the RS-FF 53 thus goes to an H level. The H level output Q4 is then transmitted to the clock terminal CL of the D-FF 35. Then, since the output IN1 of the inverting circuit 34 is at an H level under a low brightness condition as mentioned in the foregoing, the D-FF 35 produces a high level output from its Q output terminal Q1 in response to the H level output Q4. This turns off the transistor 18 and the time constant capacitor 19 begins to be charged. At this point of time, since the switch 17 has been turned on by the mounting or readying of the flash device as mentioned above, the capacitor 19 is charged with a constant current from the constant current source 15. Then, after a length of time preset for flashing, the output $\overline{SC}$ of the comparator 21 is inverted to an L level to turn off the transistor 22. With the transistor 22 turned off the power supply to the magnet 23 is cut off. This causes the shutter member to begin a closing action to end the exposure. Further, with the output of the comparator 21 inverted, the output SC of the inversion circuit 38 is inverted to an H level to actuate thereby the differentiation circuit (39–41). Then, the RS-FF 42 is set by this. Further, this resets the frequency divider circuit 61 and the T-FFs 62–64 through the OR gate 65. The frequency divider circuit and the T-FFs begin to count clock pulses again from the beginning. When the shutter members begin the closing action on the other hand, an X contact which is not shown is closed in association with this and the flash device which is also not shown emits a flash light. A flash photography operation is carried out with this flash light. Then, the flash light is reflected by the object photographed. This reflection light comes through the sub-aperture 14 to be received by the SPC 11. The reflection light incident upon the SPC 11 then causes the level of the output of the operational amplifier 10 to become high. Then, the collector potential of the transistor 30 becomes lower than the reference potential Vref2. The output of the comparator OP1 becomes an H level and is transmitted to one of the input terminals of the AND gate 36. Then, since the level of the output Q1 of the D-FF 35 is high as mentioned above, the output AN1 of the AND gate 36 becomes an H level to set the RS-FF 37. Therefore, when an H level output is produced for 16 ms from the output terminal CL4, 16 ms after the shutter closing action has been performed as mentioned above, the AND gate 55 produces an H level output for 16 ms in response to the outputs of the RS-FFs 42 and 37 and the T-FF 64. The light emitting diode 59 is then lighted up for a length of time of 16 ms by the H level output of the AND gate 55 to indicate that the a shutter action has been performed in a normal manner.

Further, if the shutter action is abnormal or, in other words, if the shutter remains closed during a flash photographic operation, the X contact does not work and no flashing action is performed. Accordingly, the output OP1 of the comparator 32 is kept at an L level. In this case, therefore, no H level output is produced by the AND gate 36 and the RS-FF 37 is not set. The AND gate 55 remains at an L level. The light emitting diode 59 remains extinguished to inform the photographer of the abnormality.

In the above embodiment, a light emitting diode is employed as indicating means. However, it goes without saying that the light emitting diode may be replaced with a sound emitting element such as a buzzer by connecting it to the collector of the transistor 58 to give an indication by a sound.

As has been described in detail, in accordance with the invention, a light flux coming through the sub-aperture, which opens and closes in association with the main aperture of the shutter, is received by the light sensitive element to detect the shutter action thereby. Compared with mechanical detecting methods, the arrangement of the invention accurately detects the shutter action and is highly advantageous as shutter action discrimination circuit for a camera.

What is claimed is:

1. A shutter action discrimination circuit for a camera having a sub-aperture which is arranged to be set in a pre-opened state with a prescribed opening when shutter members are at an initial position and a main aperture is closed, and is closed from the pre-open state and gradually opened in an association with an opening action of the main aperture when the main aperture is opened by the action of said shutter members, said circuit comprising:
   (1) light measuring means for receiving light through said sub-aperture and producing photometric information corresponding to the amount of incident light;
   (b) comparison means for comparing the photometric information of said light measuring means and reference information so as to change its output from a first state to a second state during the time the sub-aperture is closed;
   (c) first timer means for initiating a time counting action corresponding to the time to start the action of the shutter members and for producing a prescribed signal timed to indicate that the sub-aperture is closed from the pre-open state when the shutter members function properly; and
   (d) discriminating means for discerning the action of the shutter members by detecting an output state of the comparison means when the signal is produced by the first timer means.

2. A shutter action discriminating circuit according to claim 1, wherein said discriminating means includes first latching means to latch the output of the comparison means when the signal is produced from the timer means.

3. A shutter action discrimination circuit according to claim 2, wherein the discriminating means includes gate means to produce a prescribed detection signal when the first latching means latches the comparison means in the second state and at the same time when the output of the comparison means returns to its first state, and the action of the shutter members is discerned by the detection signal.

4. A shutter action discrimination circuit according to claim 3, wherein the discriminating means includes second latching means to latch the detection signal produced by the gate means when said signal is produced.

5. A shutter action discrimination circuit according to claim 1, further comprising:
   (e) exposure control means to determine a closing action initiation time of the shutter members based on the photometric information from the light measuring means;
   (f) second timer means to produce a prescribed signal after elapse of a prescribed period of time after the closing action of the shutter members is started; and
   (g) indication means to produce an indication corresponding to the discerning results of the discrimination means when the signal is produced by the second timer means.

6. A shutter action discrimination circuit according to claim 2, further comprising:
   (e) exposure control means to determine a closing action initiation time of the shutter members based on the photometric information from the light measuring means;
   (f) second timer means to produce a prescribed signal after elapse of a prescribed period of time after the closing action of the shutter members is started; and
   (g) indication means to produce an indication corresponding to the discerning results of the discrimination means when the signal is produced by the second timer means.

7. A shutter action discrimination circuit according to claim 3, further comprising:
   (e) exposure control means to determine a closing action initiation time of the shutter members based on the photometric information from the light measuring means;
   (f) second timer means to produce a prescribed signal after elapse of a prescribed period of time after the closing action of the shutter members is started; and
   (g) indication means to produce an indication corresponding to the discerning results of the discrimination means when the signal is produced by the second timer means.

8. A shutter action discrimination circuit according to claim 4, further comprising:
   (e) exposure control means to determine a closing action initiation time of the shutter members based on the photometric information from the light measuring means;
   (f) second timer means to produce a prescribed signal after elapse of a prescribed period of time after the closing action of the shutter members is started; and
   (g) indication means to produce an indication corresponding to the discerning results of the discrimination means when the signal is produced by the second timer means.

* * * * *